July 26, 1966　　　H. J. NICHOLS　　　3,262,502
MANUAL CONTROLLABLE PITCH PROPELLER SYSTEMS FOR MOTORBOATS
Filed May 28, 1964　　　　　　　　　　　　　3 Sheets-Sheet 1
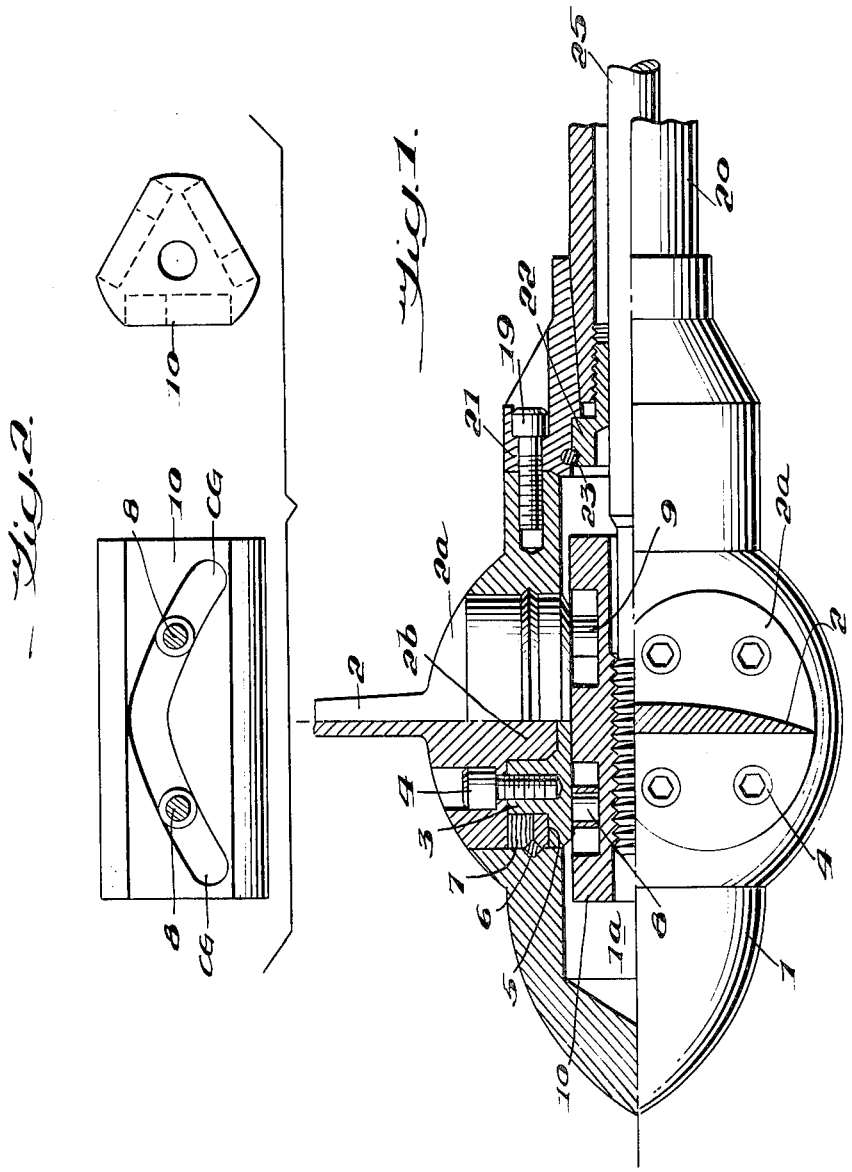
INVENTOR
HARRY J. NICHOLS
BY J. Harold Kilcoyne
ATTORNEY

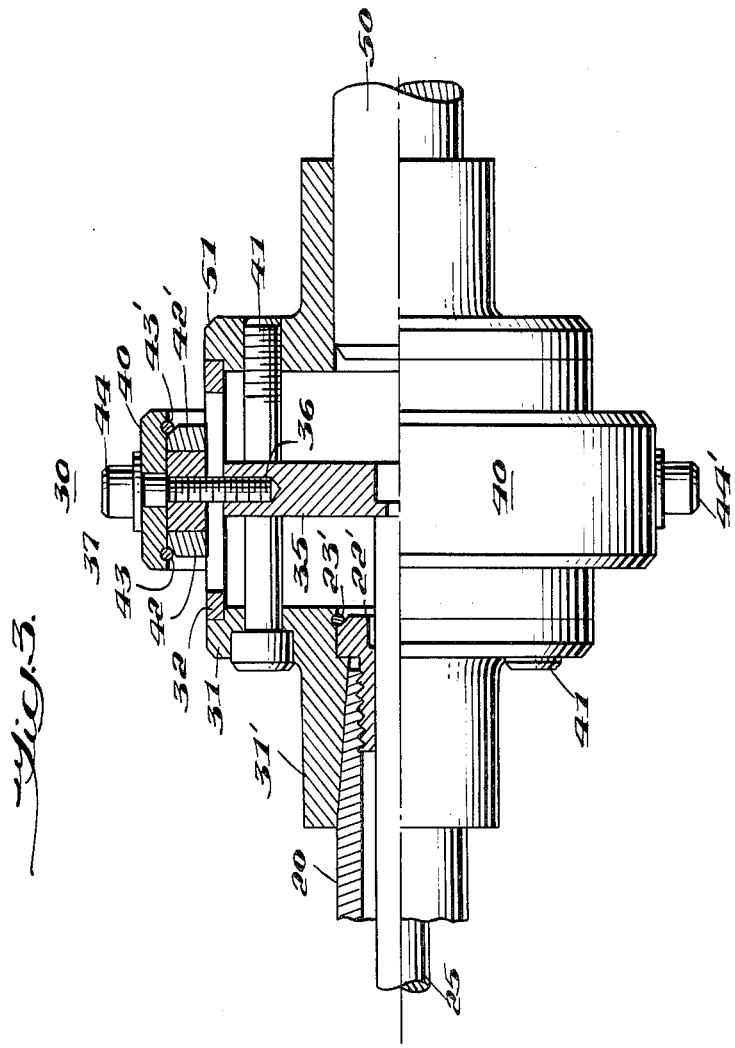

July 26, 1966 H. J. NICHOLS 3,262,502
MANUAL CONTROLLABLE PITCH PROPELLER SYSTEMS FOR MOTORBOATS
Filed May 28, 1964 3 Sheets-Sheet 3
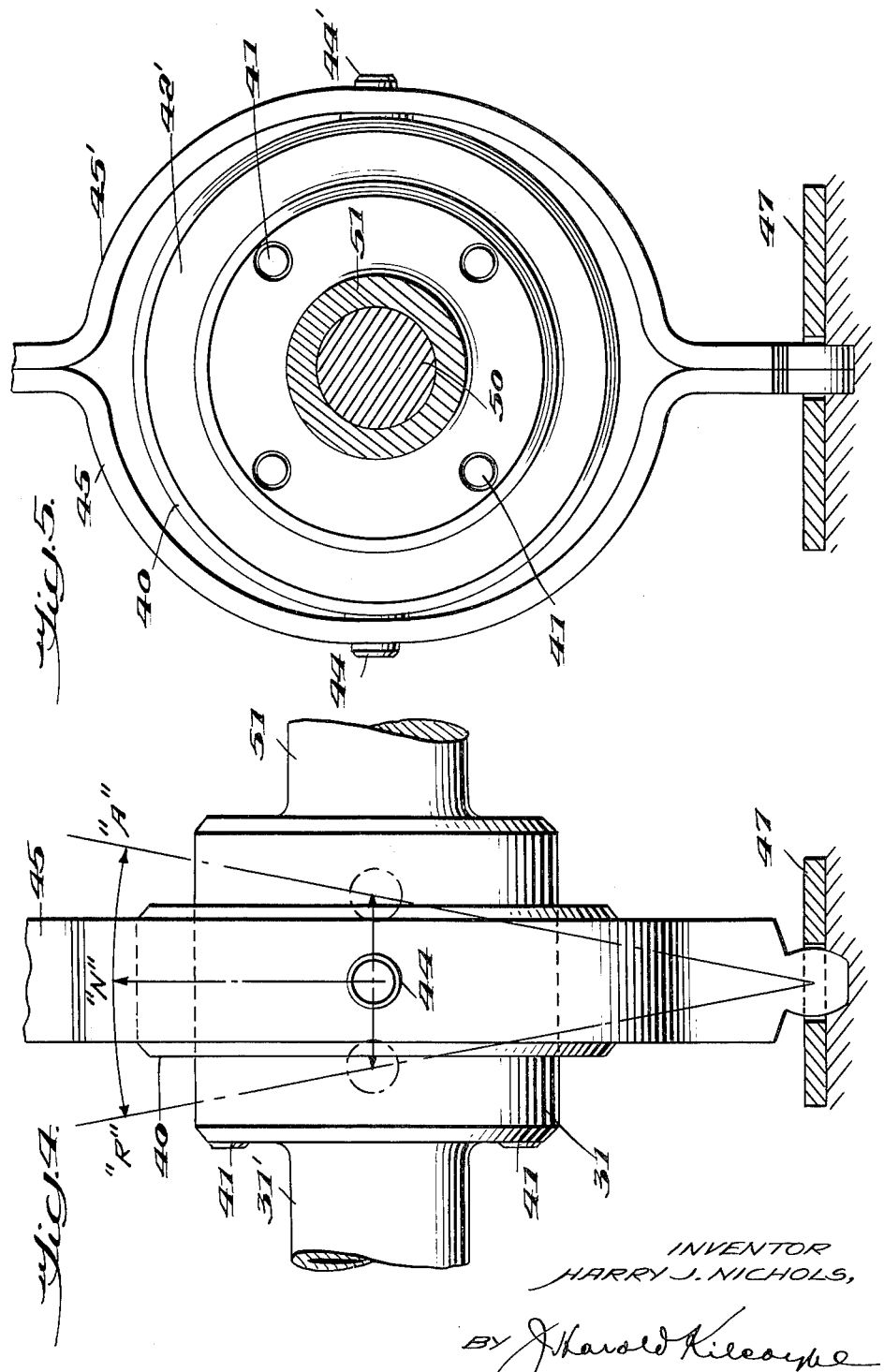
INVENTOR
HARRY J. NICHOLS,
BY J. Harold Kilcoyne
ATTORNEY

United States Patent Office 3,262,502
Patented July 26, 1966

3,262,502
MANUAL CONTROLLABLE PITCH PROPELLER SYSTEMS FOR MOTORBOATS
Harry J. Nichols, 1122 Rue Ave., Point Pleasant, N.J.
Filed May 28, 1964, Ser. No. 371,057
2 Claims. (Cl. 170—160.43)

This invention relates to a manual controllable pitch propeller system for small inboard motorboats and more particularly to a simple and compact controllable reversible pitch propeller assembly, and novel power transmission and operating means for same characterized by utmost simplicity and economy.

The prior art discloses some manually operated controllable pitch propellers for motorboats, but so far as known none of these has proved successful in practice, although many power-operated controllable pitch propellers for larger craft, such as tugs, fishing trawlers, etc., are in use. Among the main reasons for the lack of success for motorboat propellers, the following may be cited. The high-power engines currently used for motorboats with high shaft and boat speeds now prevalent make it necessary, in order to avoid loss of propulsion efficiency, to use a powerful propeller having a hub of small relative diameter; thus imposing rigid space limitations on the blade mountings and the requisite powerful mechanism located inside the hub for turning the blades about their axis. In direct conflict with these requirements, the powerful blade turning movement must be capable of turning the blades through a large angular range in order to provide for high speed ahead running; and also quickly to reverse the pitch for braking and stopping the boat and propelling it astern when required. Consequently, it is highly advantageous for the blade turning movement to provide a substantial mechanical advantage, say in the ratio of at least four to one, so that the operating force to be applied to that movement can be correspondingly reduced. The present invention provides an exceptionally compact blade-turning device which multiplies the applied operating force by more than four fold, thus increasing the range of safe manual pitch control.

When a controllable pitch propeller is driven at high speed and power, as in modern motorboats, very powerful centrifugal, thrust and torque forces work on the blades of the propeller. Also, when a controllable pitch propeller is used to brake, stop and reverse the motion of a powerful motorboat while running at top speed ahead, upon abrupt reduction of the pitch angle powerful hydraulic reaction forces act to turn the blades about their axis. Such forces must be countered or blocked to prevent forcible slam of the pitch changing mechanism, including kick-back of any manual pitch controls. Obviously, locking the manual pitch operating member in any set position will not eliminate the dangers of kickback, because the pitch controls would have to be unlocked during pitch changing operation. Furthermore, freely movable manual pitch controls are advantageous in practice. Consequently, a self-locking blade turning mechanism located in the hub is most advantageous. For if the blade turning mechanism in the hub is not inherently self-locking in any set position, some counterforce must be continually applied. Consequently, a rotary thrust bearing used for transmitting blade-operating force would necessarily run under continual load. The present invention provides a self-locking, anti-kickback safety features for the pitch changing mechanism which enables free pitch control means to be used, while the rotary thrust bearing employed during pitch changing operation normally runs unloaded.

It is therefore the main general object of the present invention to overcome the main limitations, disadvantages and drawbacks of the prior art, as particularly referred to above, and to provide a complete coordinated controllable pitch propeller system specially adapted for safe manual operation when installed in inboard motorboats such as runabouts and the like. This system is characterized by utmost simplicity, practicality, high efficiency, lowest cost, and utmost reliability and safety in operation.

Another particular object is to provide a compact, powerful propeller assembly having an efficient blade turning movement adapted to be mounted entirely within the bore of a compact propeller hub; which movement has a minimum of parts, provides an adaquate mechanical advantage, and is self-locking in any position to which it may be set.

It is well known that the clutch-and-reverse gear mechanism usually employed with motorboat engines to reverse the rotation of the propeller shaft when necessary represents a disproportionate part of the cost and weight of the power plant of the motorboat. Also, the usual clutch-and-reverse gear devices are functionally useful only when the direction of propulsion is being reversed, which obviously is a very small incidental part of the operating time. Moreover, the usual clutch-and-reverse gear devices per se can contribute nothing to the operating efficiency, since they are non-functional in normal propulsion. Hence, in general, the usual clutch-and-reverse gear transmission is highly inefficient and uneconomical. It is therefore yet another object of the invention to provide, as a subcombination of the system of the invenion, a continuous shaft-power transmission unit which provides simple shaft coupling means, a special rotary thrust bearing, and means for controlling, reversing and indicating the pitch of the propeller; thereby providing a clutchless and gearless shaft-power transmission, plus other substantial advantages.

With these and various other objects in view, as well as other advantages incident to the improved construction, the invention consists in various novel features, devices, mechanisms, and combinations of coordinated elements set forth in the clams; with the understanding that the several necessary elements constituting the same may be varied in proportion and arrangement without departing from the nature and scope of the invention as defined in the appended claims.

To enable others skilled in the art to comprehend the underlying features of this invention that they may embody the same in suitably practical applications, drawings showing a preferred embodiment of the invention form part of this disclosure and in such drawings like characters of reference denote corresponding parts in the several views, in which—

FIG. I shows a longitudinal view in the half-section of a typical propeller assembly according to the invention;

FIG. II shows top and right end views of the prismatic cam element forming a main operating part of the propeller assembly;

FIG. III shows a half longitudinal section of a typical shaft-power transmission coupling according to the invention;

FIG. IV shows a longitudinal view of the transmission coupling shown in FIG. III, with a typical pitch control lever arrangement; and FIG. V shows a right end view of the arrangement shown in FIG. IV.

*General system*

The system of the invention as a whole comprises a variable pitch propeller assembly including a unique blade turning movement as shown in FIG. I; a special transmission coupling assembly as shown in FIGS. III and IV, including pitch changing mechanism, a novel slidable rotary thrust-bearing, and a pitch controlling and indicating lever; a tubular propeller shaft having tapered ends and quick keyless couplings thereon; and a connecting operating rod slidable coaxially in the propeller shaft with a cross-head at the inboard end within the coupling assembly which operatively connects the slidable rotary thrust bearing to the blade turning movement in the propeller hub.

The propeller assembly

Referring now to FIG. I, the preferred propeller assembly of the invention comprises generally a streamline hub 1 having an axial blind bore 1a and radial open blade sockets, demountably coupled to propeller shaft 20; blades 2 with journals 3 rotatably mounted in blade sockets; and a unique compact mechanical movement for turning the blades axially in unison to vary their pitch and to lock them in any set position.

Blades 2 are provided with a circular boss 2a having a coaxial pilot 2b for facilitating machining and accurately centering the blades in their mountings. Each blade 2 is individually and detachably mounted in its blade socket by means of a demountable flanged journal 3 each fixed to its blade by cap screws 4. Each journal 3 is retained in its socket by means of a rotary thrust bearing comprising a thrust-washer 5 retained by a resilient self-locking ring 6 seated in a circumferential V-groove in the bore of the blade socket. The rotary joint between each blade and its socket is preferably sealed by a resilient soft sealing ring or gasket 7, thereby sealing out water and grit, while sealing in the lubricant provided for the hub mechanism.

The blades can be turned in unison in their bearings to change their pitch angle by a unique self-locking slidable cam movement of exceptional simplicity, compactness and power comprising a prismatic positive-motion piston cam 10 mounted coaxially and slidable in the bore 1a of hub 1 and having on each lateral face oppositely inclined curved double-edge grooves CG, herein termed chevron grooves (see FIG. II), in which twin diametral crank pins 8, projecting perpendicularly from the inner face of each blade journal, are forced to turn as followers upon axial travel of cam 10. The diametral crank pins are located on the journal face along the adjacent lateral face of cam 10. The crank pins can thus be located quite close to the axis of the propeller hub, thereby using a minimum of working space for a given crank pin and crank arm and thus enabling a hub of minimum diameter to be used; which is of particular advantage for high speed propellers, where hub drag can substantially reduce the propulsion efficiency.

The chevron grooves CG positively engage and apply a torque couple to the twin crank pins, so as to turn each blade upon axial travel of cam 10, thus changing their pitch angle. The angle through which the blades can be turned may be, say, 50°, which is quite adequate for a reversible pitch propeller. Also, the cam grooves CG are of special curvature so as to produce uniform angular displacement of the blades in direct proportion to the axial movement of cam 10, as explained in detail in my U.S. Patent No. 2,675,084, dated April 13, 1954.

The crank pins 8 are fitted with hardened roller sleeves 9 to reduce friction in the well known manner of roller chains. The crank pins may be of replacable type, although it has been found from experience that the crank pins are usually immune to damage, even if a blade is broken off by impact with a floating object. The combination of the mechanical principle of the twin crank pins which doubles the effective crank arm, and the sliding cam principle provide a compound mechanical adavntage of about 4:1, thereby reducing the ratio of the operating rod thrust force to applied torque to one-fourth; thus enabling a relatively light connecting operating rod 25 and pitch changing mechanism 30 to be used in practice. The blade turning mechanism is also quite rigid and the working parts can be fitted for negligible backlash, eliminating the danger of vibration due to spring back and looseness of parts. Due to the irreversible sliding cam action, the blades are locked in any position to which they are set, hence the normal axial force on connecting operating rod 25 is negligible compared to the working force, thus enabling a relatively small thrust transmission bearing to be used, as explained hereinafter. In this connection, experimental measurements have shown that the torque required to change the pitch of a reversible pitch propeller during crash-stop operations may be as great as one-half the propeller shaft torque, which obviously imposes extremely difficult requirements for the blade turning mechanism. However, the blade-turing movement described adequately meets all requirements.

The propeller assembly as a whole is thus characterized by ultimate simplicity, optimum compactness, ease and lost cost of manufacture and assembly, and ease of replacement of the individual blades in the event of damage, the possibility of damage being inherent in the use of marine propellers. The propeller assembly is provided with a permanent supply of suitable lubricant at assembly, and requires no further lubrication unless disassembled.

Due to the compactness of the propeller hub assembly, the propeller can in practice be located in normal relation to the hull, rudder, and strut or stern bearing; thus facilitating practical applications to existing craft as well as new construction. Further, due to the small diameter and streamline form of the hub, there is no appreciable loss of propulsion efficiency. Moreover, due to the highly efficient blade turning mechanism, the connecting rod can be of such small diameter that no increase in the normal diameter of the propeller shaft is necessary, and a relatively small pitch changing mechanism can be used in practice.

Propeller shafting and quick keyless couplings

Hub 1 is tightly fastened to the outboard end of propeller shaft 20 by means of a special quick keyless coupling assembly specially adapted to the invention as a whole. In this connection, because of economic and space requirements, propeller shafts for modern motorboats must be of minimum size commensurate with the required strength and should be adapted for ready and quick assembly and disassembly for purposes or urgent repair or replacement if worn or damaged. Also, the propeller shaft must be tubular to provide a sizable bore to accommodate the connecting rod 25, and the shaft strength must be uniform, not impaired by keyways, cross-holes, etc. To meet these complex requirements, the present invention provides special keyless couplings at each end of the propeller shaft and unique screwjack means for quickly coupling and uncoupling same.

As shown in FIG. I, the outboard end of propeller shaft 20 is somewhat tapered, and a cylindrical hub coupling collar 21 having a short cylindrical coaxial counterbore and an axially tapered bore to fit the tapered end of shaft 20 is tightly coupled thereon. Multiple cap screws 19 are seated in a circular array of longitudinal through holes in coupling collar 21, which holes coincide with matching threaded holes in the rim of hub 1; whereby hub 1 and propeller shaft 20 are fastened tightly but demountably together, as shown. The bore of propeller shaft 20 is threaded at the outboard end to receive a complementary jack-screw 22 having a button head with a wrench socket and an axial bore, as indicated. By means of jack-screw 22, coupling collar 21 can be pulled tightly on the taper of propeller shaft 20, thus providing a semipositive coupling connection capable of transmitting the normal driving torque to the propeller, but which can slip in the event the propeller blades strike an obstruction; thereby the propeller shaft is protected against torsional failure in such event. In order to enable collar 21 to be uncoupled readily and quickly from propeller shaft 20, the cylindrical counterbore of collar 21 is provided with a circumferential half-round groove, spaced somewhat from jack-screw 22, into which is sprung a resilient uniform section thrust-ring 23, as shown. When connecting rod 25 is withdrawn, jack-screw 22 can be turned by a suitable ordinary key-wrench to loosen same and when the head of jack-screw 22 bears against thrust-ring 23, which then functions as a thrust shoulder, coupling collar 21 can be forcibly pushed off the tapered end portion of propeller shaft 20, thus uncoupling these parts. Hence, reversible jack-screw 22 can be turned in one direction for quickly coupling shaft 20 and coupling collar 21 and turned in the reverse direction for quickly uncoupling these parts by means of thrust-ring 23.

The transmission coupling assembly

Referring to FIGS. III and IV, the special transmission coupling assembly 30 comprises a quickly demountable keyless shaft coupling assembly which bears operating mechanism for transmitting pitch control motion from a stationary driving trunnion ring 40 to axial connecting rod 25. Thus, the transmission coupling assembly 30 combines twin-flange means for transmitting torque from a drive shaft 50, in this case the engine shaft, to propeller shaft 20, with means for transmitting push-pull pitch control motion from a stationary pitch control lever 45 to connecting-rod 25 which rotates bodily with propeller shaft 20. Because of the extraordinary high speed of modern marine engines, which may produce a propeller shaft speed exceeding 6,000 r.p.m., the motion transmitting mechanism carried thereby must be specially adapted for perfect balance, to withstand high rubbing speed in the rotary thrust bearing, and to provide adequate lubrication of bearing surfaces during continuous or intermittent operation during long time periods.

Referring to FIGS. III and IV in detail, propeller shaft driven flange 31 and drive flange 51 each has a circular rabbet cut in its face at the rim so as to mate with the ends of cylindrical spacer sleeve 32, whose main function is to hold rigidly apart coupling flanges 31, 51, and whose secondary function is to mount the novel rotary thrust bearing assembly of the invention. Coupling flange 31 extends radially from a coupling collar 31' which is fitted to and preferably demountably coupled on propeller shaft 20, having a tapered portion at the inboard end, by quick coupling and uncoupling means including jack-screw 22' and thrust ring 23', as provided at the outboard end of the propeller shaft. Coupling flange 51, which in practice may be provided as a part of the engine, may be rigidly coupled on drive shaft 50 by suitable conventional means or by quick coupling and uncoupling means similar to that employed for coupling flange 31 on propeller shaft 20. Flanges 31, 51 are also each provided with plural-bolt holes equally spaced on equal coaxial circles, so that the bolt holes match. Clamping bolts 41 are mounted in the matching bolt holes to draw the coupling flanges and spacer sleeve tightly together, thus to provide a rigid coupling assembly adapted to transmit driving torque and thrust from the drive shaft 50 to propeller shaft 20. Mounted concentrically midway on sleeve 32 is a plain bearing ring 37 of uniform rectangular section and whose bore is complemental to the barrel of sleeve 32, and slides thereon, ring 37 being of suitable hard material with smooth surfaces adapted to withstand high rubbing speeds of, say 5,000 f./s.

A flat cross-head disc 35 whose perimeter is adapted to mate loosely with the bore of spacer sleeve 32 is mounted rigidly on the inboard end of connecting rod 25. Spacer sleeve 32 is also provided with, say, four longitudinal straight slots, and dowels 36 or the like are mounted spoke-like radially in disc 35, so that their outer ends extend into matching radial holes in bearing ring 37; whereby connecting-rod 25, cross-head disc 35 and bearing ring 37 constitute a positively connected assembly acting as a single part. Mounted concentrically on bearing ring 37 is concentric trunnion ring 40, carrying diametral twin trunnions 45, 45'. Trunnion ring 40 also carries a pair of demountable thrust bearing washers 42, 42' preferably retained in trunnion ring 40 by twin plain snap rings 43, 43', as shown. Thrust bearing washers 42, 42' are preferably of porous bearing metal capable of holding a supply of oil by capillary action, commonly termed "oil-less" bearings; whereby oil films are maintained between bearing ring 37 and thrust bearing washers 42, 42'. Moreover, due to centrifugal action, bearing ring 37 transfers oil derived from thrust bearing washers 42, 42' to maintain a continuous oil film between itself and trunnion ring 40. Thus, the special high-speed thrust bearing described avoids the usual loss of oil due to centrifugal action and drippage.

It may be noted here that due to the self-locking action of the unique blade turning movement in the propeller hub, the rotary thrust bearing assembly of parts 37, 42, 42', 43, 43', and 40 normally runs without thrust load, and transmits heavy operating forces only when the pitch of the propeller is being changed, which is less than one percent of the operating time in the normal routine of motorboats. Obviously, this feature of the invention whereby the pitch changing mechanism, including the rotary thrust bearing, normally runs without load, provides a major operating advantage which avoids costly friction losses and wear. Also the demountable washers 42, 42' can be readily replaced if necessary.

While trunnion ring 40 could be moved along sleeve 32, by various known lever-operated shifting mechanisms for purposes of pitch changes, a preferred pitch shift mechanism is illustrated in FIGS. IV–V. The preferred means for sliding trunnion ring 40 axially comprise a symmetrical pair of bent levers 45, 45' mounted astraddle trunnion ring 40, of the transmission assembly as shown. These levers have reduced step end portions adapted to pivot in a common hole in a stationary fulcrum piece 47 mounted on any convenient stationary supporting structure, as indicated, whereby trunnion ring 40 can be positioned by swinging these levers as a unit, in the well known manner of gear shift levers.

Since the entire pitch changing mechanism produces a coordinated positive linear movement, the position of the pitch shifting lever also indicates the actual pitch angle of the propeller blades and hence of the propeller as an entity. Accordingly, the pitch shifting lever 45 which positions trunnion ring 40 also constitutes a pitch controlling and pitch indicating lever, herein termed briefly a pitch control lever.

Operation

The operating parts are shown in mid position and the blades in neutral position. However, in practice more ahead than astern pitch is provided, in accordance with propulsion requirements, since full astern speed of motorboats is undesirable and unsafe. The general operation of the pitch changing mechanism is as follows:

In neutral propeller pitch, indicated by the pitch control lever 45 being at the neutral or "N" position, the blades are disposed crosswise relative to the hub at effectively zero thrust, so that no way is put on the boat when the engine is started or running idle. To get underway, the pitch control lever is moved forward towards the ahead or "A" position, thereby moving trunnion ring 40 axially relative to the transmission assembly, and also moving thrust rings 42, 37, and 42' cross-head disc 35, connecting rod 25 and cam 10 axially relative to the propeller shaft and tub. The chevron grooves CG in the faces of cam 10 impart a *torque couple* to each of the blade journals by means of the twin crank pins, which torque couples turn the blades 2 in unison to increase their pitch in a positive driving direction. The boat is then driven ahead by the engine and propeller in the usual manner.

To reduce or reverse the propeller pitch, thereby to slow down or reverse the motion of the boat, pitch control lever 45 is moved towards the reverse or "R" position, thus moving the various links of the operating mechanism in the reverse direction, whereby the pitch of the blades is reduced or reversed, which in effect reverses the pitch so as to cause braking, stopping and reverse thrust action on the boat.

By reason of the system of rigid links of the operating mechanism and the linear relation between the axial displacement of the cam and the angle of the propeller blades, the position of the pitch control lever always represents directly and accurately the pitch angle of the propeller. Accordingly, the pitch can be set exactly to any desired intermediate point in the pitch range merely by properly positioning the pitch control member. Due to the mechanical advantage and efficiency of the unique pitch changing mechanism, the reaction forces on the pitch control lever during pitch changing operation are greatly diminished, with the practical result that the pitch control mechanism of the invention can be used to provide manual control of the pitch of propellers of powerful, high-speed motorboats, say up to a hundred horsepower. Furthermore, due to the self-locking and "anti-kickback" characteristics of the blade turning movement, any recoil force at the manual operating member while the pitch is being changed or reversed is eliminated, thus eliminating any danger of loss of control or injury to the operator. Thus, the unique blade turning and operating mechanism of the invention provides adequate, reliable and safe means for the manual control of controllable reversible pitch propellers for small motorboats.

Although in accordance with the provisions of the patent statutes, this invention is described as embodied in concrete form, it will be understood that the elements and connections shown and described are merely illustrative and that the invention is not limited thereto since alterations and modifications will readily suggest themselves to persons skilled in the art without departing from the spirit of this invention or from the scope of the annexed claims.

I claim:

1. In a controllable pitch marine propeller system, the coordinated combination consisting of: a driven tubular propeller shaft; a propeller assembly coupled on the outboard end of said shaft including a hub with an axial bore and having radial propeller blades journaled in said hub so as to be turnable about their axes and a self-locking blade-turning movement having a grooved single cam for turning and locking said blades reciprocatable coaxially in said bore; an axially reciprocatable connecting rod fastened to said cam and extending through said propeller shaft; a demountable bolted twin-flange coupling assembly for driving said propeller shaft consisting of: a driven coupling flange having a cylindrical collar portion fitted to and demountably coupled coaxially on the inboard end of said propeller shaft, a hollow cylindrical spacer sleeve coupled coaxially on the rim of said flange, a similar driving coupling flange coupled coaxially on the opposite end of said spacer sleeve, and longitudinal internal clamping bolts for integrating said flanges and said spacer sleeve; and means for reciprocating said connecting rod comprising a cross-head plate fastened to said connecting rod within said spacer sleeve and reciprocatable coaxially therein, a ring thrust-bearing mounted around and coaxially slidable on said spacer sleeve, and means for fastening said thrust-bearing to said cross-head plate; whereby said thrust bearing, said cross-head plate and said cam are reciprocatable as an integrated unit for turning and locking said blades.

2. An adjustable pitch propeller system for motorboats comprising in combination: a driven tubular propeller shaft; a propeller assembly fastened to the outboard end of said shaft including a hub having an axial bore and mounting blades turnable about their axes and a self-locking blade-turning mechanism including a single operating cam for turning said blades axially reciprocatable within said bore; an axially reciprocatable connecting rod fastened to said cam and extending coaxially through said shaft; a twin-flange coupling assembly for driving said shaft consisting of a driven coupling flange having means for demountably coupling the inboard end of said shaft thereto, a hollow cylindrical spacer sleeve coupled coaxially to the rim of said flange, a similar driving coupling flange coupled coaxially to the opposite end of said spacer sleeve, and longitudinal internal clamping bolts for integrating said flanges and said spacer sleeve; and means for reciprocating said connecting rod comprising a ring thrust-bearing mounted around said spacer sleeve and coaxially reciprocatable thereon, and a cross-head assembly mounted within said spacer sleeve for connecting said thrust-bearing to said connecting rod; whereby said thrust-bearing, said connecting rod and said cam provide an integrated reciprocatable mechanism for adjusting and locking the pitch of said blades.

References Cited by the Examiner

UNITED STATES PATENTS

| 457,513 | 8/1891 | Littlejohn | 170—160.47 X |
|---|---|---|---|
| 512,627 | 1/1894 | Sintz | 170—160.34 |
| 1,396,325 | 11/1921 | Gloor | 170—160.39 |
| 1,837,568 | 12/1931 | Moody | 170—160.46 X |
| 1,982,283 | 11/1934 | Briner | 170—160.39 |
| 2,108,660 | 2/1938 | Farrell. | |
| 2,279,633 | 4/1942 | Merickle | 170—160.43 X |
| 2,495,453 | 1/1950 | Herreshoff | 170—160.43 X |
| 2,670,805 | 3/1954 | Nichols | 170—160.47 X |
| 2,699,221 | 1/1955 | Nichols | 170—160.47 |
| 2,776,719 | 1/1957 | Nichols | 170—160.47 |
| 3,086,595 | 4/1963 | Nichols | 170—160.45 |

FOREIGN PATENTS

| 999,092 | 10/1951 | France. |
|---|---|---|
| 183,399 | 4/1907 | Germany. |
| 846,065 | 8/1952 | Germany. |
| 369,853 | 3/1932 | Great Britain. |

MARTIN P. SCHWADRON, *Primary Examiner.*

JULIUS E. WEST, SAMUEL LEVINE, *Examiners.*

E. A. POWELL, JR., *Assistant Examiner.*